United States Patent
Urman et al.

(10) Patent No.: US 11,323,372 B2
(45) Date of Patent: May 3, 2022

(54) FLEXIBLE STEERING

(71) Applicant: MELLANOX TECHNOLOGIES, LTD., Yokneam (IL)

(72) Inventors: Avi Urman, Yokneam Illit (IL); Lior Narkis, Petah-Tikva (IL); Ariel Shahar, Jerusalem (IL)

(73) Assignee: MELLANOX TECHNOLOGIES LTD., Yokneam (IL)

( * ) Notice: Subject to any disclaimer, the term of this patent is extended or adjusted under 35 U.S.C. 154(b) by 228 days.

(21) Appl. No.: 16/853,783

(22) Filed: Apr. 21, 2020

(65) Prior Publication Data
US 2021/0328923 A1 Oct. 21, 2021

(51) Int. Cl.
*H04L 45/7453* (2022.01)
*H04L 47/22* (2022.01)

(52) U.S. Cl.
CPC .......... *H04L 45/7453* (2013.01); *H04L 47/22* (2013.01)

(58) Field of Classification Search
CPC ....... H04L 45/70; H04L 45/74; H04L 45/745; H04L 45/7453; H04L 47/10; H04L 47/122; H04L 47/125; H04L 47/22
See application file for complete search history.

(56) References Cited

U.S. PATENT DOCUMENTS

| | | |
|---|---|---|
| 5,394,394 A | 2/1995 | Crowther et al. |
| 6,308,219 B1 | 10/2001 | Hughes |
| 6,356,951 B1 | 3/2002 | Gentry, Jr. |
| 6,504,842 B1 * | 1/2003 | Bergenfeld ......... H04L 12/1886 370/389 |
| 6,788,680 B1 | 9/2004 | Perlman et al. |
| 6,807,172 B1 * | 10/2004 | Levenson ........... H04L 49/3009 370/389 |
| 7,333,484 B2 | 2/2008 | Henderson et al. |
| 7,623,468 B2 | 11/2009 | Panigrahy et al. |
| 7,921,046 B2 | 4/2011 | Parsons et al. |
| 8,161,468 B2 | 4/2012 | Todd |
| 8,694,448 B2 | 4/2014 | Mandelbaum et al. |
| 8,705,533 B1 | 4/2014 | Venkatraman et al. |

(Continued)

OTHER PUBLICATIONS

U.S. Appl. No. 16/708,470 Office Action dated Jul. 20, 2021.

(Continued)

*Primary Examiner* — Kevin D Mew
(74) *Attorney, Agent, or Firm* — Kligler & Associates Patent Attorneys Ltd

(57) ABSTRACT

In one embodiment, a network device includes an interface configured to receive a data packet including a header section, at least one parser to parse the data of the header section yielding a first header portion and a second header portion, a packet processing engine to fetch a first match-and-action table, match a first index having a corresponding first steering action entry in the first match-and-action table responsively to the first header portion, compute a cumulative lookup value based on the first header portion and the second header portion responsively to the first steering action entry, fetch a second match-and-action table responsively to the first steering action entry, match a second index having a corresponding second steering action entry in the second match-and-action table responsively to the cumulative lookup value, and steering the packet responsively to the second steering action entry.

20 Claims, 11 Drawing Sheets

(56) References Cited

U.S. PATENT DOCUMENTS

| | | | |
|---|---|---|---|
| 9,209,990 B1* | 12/2015 | Szabo | H04L 12/4641 |
| 10,015,090 B2 | 7/2018 | Arad et al. | |
| 10,616,111 B1* | 4/2020 | Immidi | H04L 45/245 |
| 2003/0043848 A1 | 3/2003 | Sonksen | |
| 2004/0081101 A1 | 4/2004 | Bennett | |
| 2004/0088430 A1 | 5/2004 | Busi et al. | |
| 2005/0089016 A1 | 4/2005 | Zhang et al. | |
| 2005/0108617 A1* | 5/2005 | Lappin | H04L 69/22 714/781 |
| 2006/0062144 A1* | 3/2006 | Testa | H04L 47/215 370/229 |
| 2007/0276952 A1 | 11/2007 | Mitchell | |
| 2008/0025308 A1 | 1/2008 | Morgan et al. | |
| 2008/0095149 A1 | 4/2008 | Dai | |
| 2009/0097418 A1* | 4/2009 | Castillo | H04L 41/5035 370/255 |
| 2011/0149895 A1 | 6/2011 | Sala et al. | |
| 2013/0022128 A1 | 1/2013 | Symes | |
| 2013/0215906 A1 | 8/2013 | Hidai | |
| 2015/0081726 A1 | 3/2015 | Izenberg | |
| 2015/0081833 A1* | 3/2015 | Pettit | H04L 67/2842 709/213 |
| 2015/0156288 A1 | 6/2015 | Lu et al. | |
| 2015/0172189 A1 | 6/2015 | Pitchai et al. | |
| 2015/0256456 A1 | 9/2015 | Previdi et al. | |
| 2015/0341265 A1 | 11/2015 | Basso et al. | |
| 2016/0094667 A1 | 3/2016 | Jani | |
| 2016/0139892 A1 | 5/2016 | Atreya et al. | |
| 2016/0197852 A1 | 7/2016 | Hutchison et al. | |
| 2017/0064047 A1 | 3/2017 | Bosshart | |
| 2017/0168970 A1* | 6/2017 | Sajeepa | G06F 13/1631 |
| 2017/0180253 A1* | 6/2017 | Koren | H04L 45/7453 |
| 2017/0286292 A1 | 10/2017 | Levy et al. | |
| 2018/0242218 A1* | 8/2018 | Muscariello | H04W 80/00 |
| 2018/0287941 A1* | 10/2018 | Louzoun | H04L 69/22 |
| 2018/0288197 A1 | 10/2018 | Izenberg | |
| 2018/0288614 A1 | 10/2018 | Zaks et al. | |
| 2019/0004701 A1 | 1/2019 | Guim Bernat et al. | |
| 2019/0073719 A1 | 3/2019 | Parsons et al. | |
| 2019/0123984 A1* | 4/2019 | Nainar | H04L 43/12 |
| 2019/0132421 A1 | 5/2019 | Fedyak | |
| 2019/0140979 A1* | 5/2019 | Levi | G06F 9/45558 |
| 2019/0182366 A1 | 6/2019 | Kfir et al. | |
| 2019/0215384 A1 | 7/2019 | Kfir et al. | |
| 2021/0306257 A1* | 9/2021 | Dutta | H04L 45/20 |

OTHER PUBLICATIONS

Gibb et al., "Design Principles for Packet Parsers", ACM/IEEE Symposium on Architectures for Networking and Communications Systems (ANCS), pp. 1-12, Oct. 2013.

Deering et al., "Internet Protocol, Version 6 (IPv6) Specification", Request for Comments: 2460, pp. 1-39, Dec. 1998.

University of Southern California, "Darpa Internet Program", Protocol Specification, Request for comments 791, pp. 1-50, Sep. 1981.

Urman et al., U.S. Appl. No. 16/708,470, filed Dec. 10, 2019.

EP Application #20213217.1 Search Report dated May 4, 2021.

Cheng et al., "Telco Distributed DC with Transport Protocol Enhancement for 5G Mobile Networks," working paper, Karlstad University, Faculty of Health, Science and Technology, pp. 1-58, Dec. 2017.

* cited by examiner

FLEXIBLE STEERING

FIELD OF THE INVENTION

The present invention relates to computer networks, and in particular, but not exclusively to, steering in network devices.

BACKGROUND

A network interface controller (NIC) (referred to in certain networks as a host bus adapter (HBA) or host channel adapter (HCA)) is a unit which manages the communications between a computer (e.g., a server) and a network, such as a local area network or switch fabric. The NIC directs packets from the network to their destination in the computer, for example by placing the packets in a buffer of a destination application in a memory unit of the computer and directs outgoing packets, for example sending them either to the network or to a loopback port. The directing of packets to their destination is generally referred to as steering, which includes determining a required destination of the packet and forwarding the packet to its destination.

Steering may be used in receive side scaling (RSS), which is a network driver technology that enables the efficient distribution of network receive processing across multiple central processing units (CPUs) in multiprocessor systems. To process received data efficiently, a miniport driver's receive interrupt service function schedules a deferred procedure call (DPC). Without RSS, a typical DPC indicates all received data within the DPC call. Therefore, all of the receive processing that is associated with the interrupt runs on the CPU where the receive interrupt occurs. With RSS, the NIC and miniport driver provide the ability to schedule receive DPCs on other processors. Also, the RSS design ensures that the processing that is associated with a given connection stays on an assigned CPU. The NIC may implement a hash function using 5-tuple header information as input and the resulting hash value provides the means to select a CPU.

US Patent Application 2017/0286292 of Levy, et al., describes a network element having a decision apparatus, which has a plurality of multi-way hash tables of single size and double size associative entries. A logic pipeline extracts a search key from each of a sequence of received data items. A hash circuit applies first and second hash functions to the search key to generate first and second indices. A lookup circuit reads associative entries in the hash tables that are indicated respectively by the first and second indices, and matches the search key against the associative entries in all the ways. Upon finding a match between the search key and an entry key in an indicated associative entry. A processor uses the value of the indicated associative entry to insert associative entries from a stash of associative entries into the hash tables in accordance with a single size and a double size cuckoo insertion procedure.

U.S. Pat. No. 10,015,090 to Arad, et al., describes a method for steering packets including receiving a packet and determining parameters to be used in steering the packet to a specific destination, in one or more initial steering stages, based on one or more packet specific attributes. The method further includes determining an identity of the specific destination of the packet in one or more subsequent steering stages, governed by the parameters determined in the one or more initial stages and one or more packet specific attributes, and forwarding the packet to the determined specific destination.

US Patent '090 describes packet steering by a network interface controller (NIC). The steering optionally includes determining for packets, based on their headers, a destination to which they are forwarded. The destination may be identified, for example, by a virtual unit identity, such as a virtual HCA-1D, and by a flow interface, e.g., an InfiniBand queue pair (QP) or an Ethernet receive ring. In some embodiments, the packet steering unit performs a multi-stage steering process in determining a single destination of the packet. The multi-stage steering process includes a plurality of stages in which a table lookup is performed based on packet specific information, e.g., address information in the packet. The packet specific information may include information in the packet and/or information on the packet not included in the packet, such as the port through which the packet was received. It is noted that the multi-stage steering process may forward the packet to additional destinations, in addition to the single destination. Furthermore, a single stage may be used to steer the packet to a plurality of the additional destinations.

The use of a plurality of stages to forward packets to their destination, allows gearing the steering process to the specific packet being handled. In each stage, the parameters of the next lookup stage are optionally selected, so that in each stage only the relevant parameters are consulted. Thus, the steering tables are smaller, the hardware of the packet steering unit is simpler, and the steering configuration is more flexible. In some embodiments, different packets are steered to their destination in a different number of stages. Using different numbers of stages for different packets allows for more efficient steering, applying more stages to packets requiring complex steering and allowing for low latency forwarding of some of the packets. By allowing the packet information to be consulted for steering in a plurality of different stages, the amount of packet information consulted for some packets may be larger than for other packets, allowing more flexibility in the steering process. In addition, the steering may relate to different packet fields for different packets. For example, the packet steering for specific streams requiring load balancing between CPU cores may take into account one or more fields, such as source and destination IP address fields and/or UDP or TCP port fields, in performing load balancing by the steering unit. For other streams, not requiring load balancing, the steering unit does not examine these fields at all, such that the steering of these other streams is achieved much faster.

SUMMARY

There is provided in accordance with an embodiment of the present disclosure, a network device, including an interface configured to receive a data packet including a header section, at least one parser coupled to receive data of the header section of the packet, and configured to parse the data of the header section yielding a first header portion and a second header portion, a memory configured to store a plurality of match-and-action tables, each match-and-action table including respective indices and a respective steering action entry corresponding to each of the respective indices, and a packet processing engine coupled to receive the first header portion and the second header portion, and configured to fetch from the memory a first match-and-action table of the plurality of match-and-action tables, match a first index having a corresponding first steering action entry in the first match-and-action table responsively to the first header portion, compute a cumulative lookup value based on the first header portion and the second header portion responsively to the first steering action entry, fetch from the memory a second match-and-action table of the plurality of match-and-action tables responsively to the first steering action entry, match a second index having a corresponding second steering action entry in the second match-and-action table responsively to the cumulative lookup value, and steer the packet responsively to the second steering action entry.

Further in accordance with an embodiment of the present disclosure the first steering action entry indicates that the cumulative lookup value should be computed based on the second header portion.

Still further in accordance with an embodiment of the present disclosure the first steering action entry indicates to the packet processing engine to use the cumulative lookup value when performing matching in the second match-and-action table.

Additionally, in accordance with an embodiment of the present disclosure a steering action entry indicates to the packet processing engine to reset the cumulative lookup value, and the packet processing engine is configured to reset the cumulative lookup value.

Moreover, in accordance with an embodiment of the present disclosure a steering action entry indicates to the packet processing engine not to use the cumulative lookup value when performing matching in one of the match-and-action tables.

Further in accordance with an embodiment of the present disclosure the at least one parser is also configured to parse the data of the header section yielding a third header portion, and the packet processing engine is configured to fetch a third match-and-action table of the plurality of match-and-action tables, and match a third index having a corresponding third steering action entry in the third match-and-action table responsively to the third header portion.

Still further in accordance with an embodiment of the present disclosure the packet processing engine is configured to compute the cumulative lookup value based on the first header portion, the second header portion, and the third header portion.

Additionally in accordance with an embodiment of the present disclosure the packet processing engine is configured to compute a first hash value responsively to the first header portion, match the first index in the first match-and-action table responsively to the first hash value, compute a second hash value responsively to the second header portion, and compute the cumulative lookup value based on the first hash value and the second hash value responsively to the first steering action entry.

Moreover, in accordance with an embodiment of the present disclosure the first steering action entry indicates that the cumulative lookup value should be computed based on the second hash value.

Further in accordance with an embodiment of the present disclosure the first steering action entry indicates to the packet processing engine to use the cumulative lookup value when performing matching in the second match-and-action table.

Still further in accordance with an embodiment of the present disclosure a steering action entry indicates to the packet processing engine to reset the cumulative lookup value, and the packet processing engine is configured to reset the cumulative lookup value.

Additionally, in accordance with an embodiment of the present disclosure a steering action entry indicates to the packet processing engine not to use the cumulative lookup value when performing matching in one of the match-and-action tables.

Moreover in accordance with an embodiment of the present disclosure the at least one parser is also configured to parse the data of the header section yielding a third header portion, and the packet processing engine is configured to compute a third hash value responsively to the third header portion, fetch from the memory a third match-and-action table of the plurality of match-and-action tables, and match a third index having a corresponding third steering action entry in the third match-and-action table responsively to the third hash value.

Further in accordance with an embodiment of the present disclosure the packet processing engine is configured to compute the cumulative lookup value based on the first hash value, the second hash value, and the third hash value.

Still further in accordance with an embodiment of the present disclosure the first steering action entry includes any one or more of the following forwarding the packet to be processed by at least one selected central processing unit, forwarding the packet to at least one selected destination, dropping the packet, forwarding the packet to an indicated destination, continuing processing with another one of the match-and-action tables, adding a current hash value to the cumulative lookup value, adding data of a header portion to the cumulative lookup value, using the cumulative lookup value when performing matching, not using the cumulative lookup value when performing matching, using a specific portion of the header section, or using a specific portion of the header section when computing a hash.

There is also provided in accordance with another embodiment of the present disclosure, a networking method, including receiving a data packet including a header section, parsing data of the header section yielding a first header portion and a second header portion, storing a plurality of match-and-action tables, each match-and-action table including respective indices and a respective steering action entry corresponding to each of the respective indices, fetching a first match-and-action table of the plurality of match-and-action tables, matching a first index having a corresponding first steering action entry in the first match-and-action table responsively to the first header portion, computing a cumulative lookup value based on the first header portion and the second header portion responsively to the first steering action entry, fetching a second match-and-action table of the plurality of match-and-action tables responsively to the first steering action entry, matching a second index having a corresponding second steering action entry in the second match-and-action table responsively to the cumulative lookup value, and steering the packet responsively to the second steering action entry.

Additionally in accordance with an embodiment of the present disclosure, the method includes parsing the data of the header section yielding a third header portion, fetching a third match-and-action table of the plurality of match-and-action tables, and matching a third index having a corresponding third steering action entry in the third match-and-action table responsively to the third header portion.

Moreover in accordance with an embodiment of the present disclosure, the method includes computing a first hash value responsively to the first header portion, matching the first index in the first match-and-action table responsively to the first hash value, computing a second hash value responsively to the second header portion, and computing the cumulative lookup value based on the first hash value and the second hash value responsively to the first steering action entry.

Further in accordance with an embodiment of the present disclosure, the method includes parsing the data of the header section yielding a third header portion, computing a third hash value responsively to the third header portion, fetching a third match-and-action table of the plurality of match-and-action tables, and matching a third index having a corresponding third steering action entry in the third match-and-action table responsively to the third hash value.

Still further in accordance with an embodiment of the present disclosure the first steering action entry includes any one or more of the following forwarding the packet to be processed by at least one selected central processing unit, forwarding the packet to at least one selected destination, dropping the packet, forwarding the packet to an indicated destination, continuing processing with another one of the match-and-action tables, adding a current hash value to the cumulative lookup value, adding data of a header portion to the cumulative lookup value, using the cumulative lookup value when performing matching, not using the cumulative lookup value when performing matching, using a specific portion of the header section, or using a specific portion of the header section when computing a hash.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
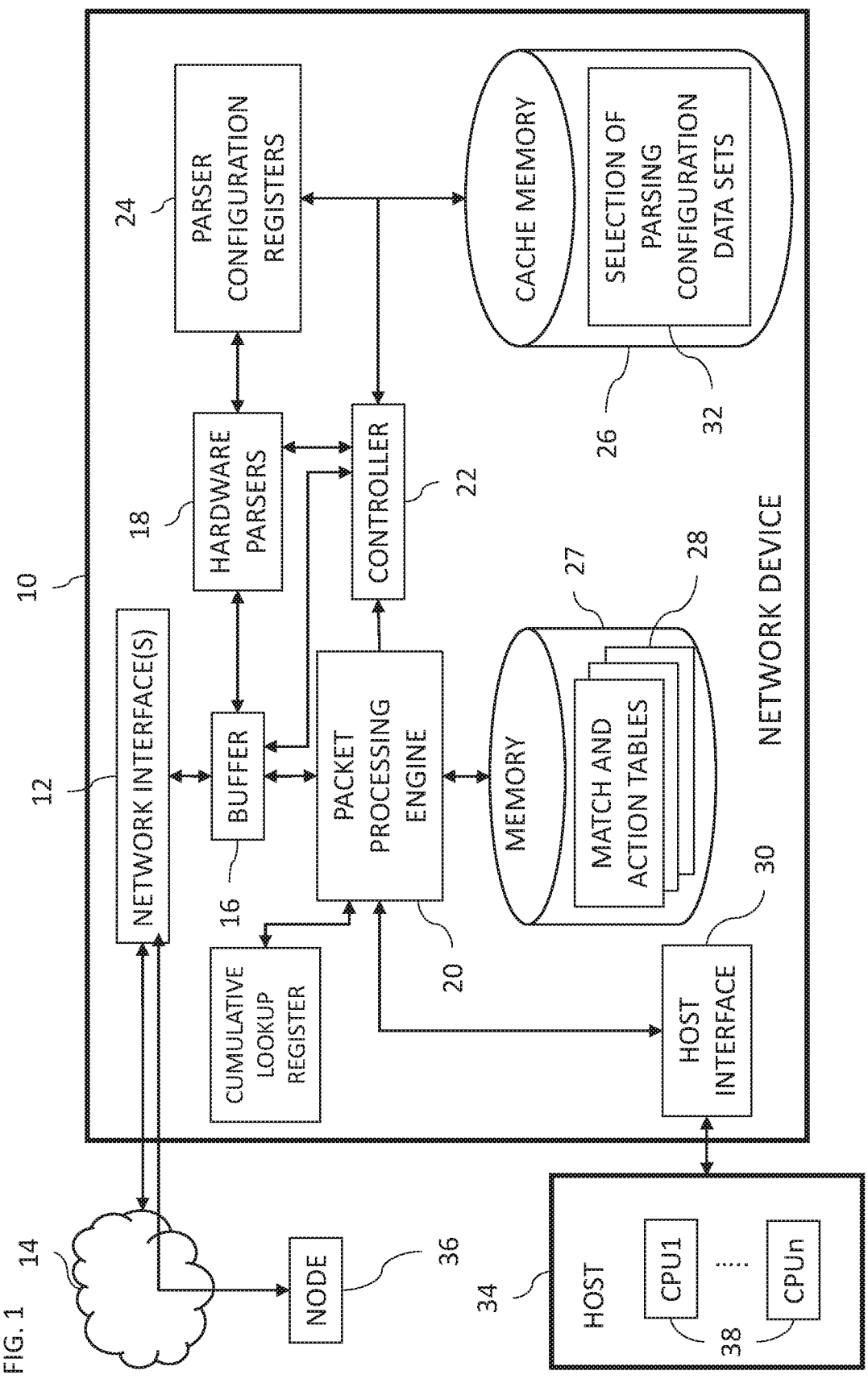
FIG. 1 is a block diagram view of a network device constructed and operative in accordance with an embodiment of the present invention.

As previously mentioned, receive side scaling (RSS) ensures that processing that is associated with a given connection stays on an assigned CPU. The network interface controller (NIC) typically implements a hash function using 5-tuple header information (e.g., source IP address/port number, destination IP address/port number and the protocol in use) as input and the resulting hash value provides the means to select a CPU.

Steering decisions made on 5-tuple header information may be too limiting in some scenarios. For example, with network function virtualization (NFV) where packets may have multiple virtualization and tunneling protocols such as General Packet Radio Service (GPRS) Tunneling Protocol (GTP), Virtual Local Area Network (LAN) (VLAN), Multiprotocol Label Switching (MPLS) and Virtual Extensible LAN (VXLAN), steering decisions may need to take into account the header of one or more of the virtualization or tunneling protocols.

On the transmission side, steering decisions may be used to perform load balancing between different physical ports or between different destinations (for example, different servers providing the same service), by way of example. In order to perform the transmission side steering decisions header information from one or more headers may be used.

Whether dealing with the receiving side or the transmission side, the steering decisions may be non-standard and therefore simply using the 5-tuple header information for those steering decisions is insufficient. One solution to provide for non-standard steering decisions is to use a multi-stage steering process in which multiple tables are fetched, and a single header entry is looked up per table (for example, a hash of the MAC header may be looked up in a hash table, and a hash of the IP header may be looked up in an IP table and so on). This solution is may lack efficiency and require large tables.

Embodiments of the present invention solve the above problems by providing a network device in which a steering decision is made based on a multi-stage steering process using any suitable combination of any suitable user selectable header fields resulting in a more efficient multi-stage steering process. The user may select any set of fields from the packet headers that are to be used as an input to a hash function. The results of the hashes are used for lookup in match-and-action tables according to the configuration of the tables. Each match-and-action table includes multiple steering entries with each entry including an index and a respective steering action entry. The steering action entry may indicate a CPU to process the packet, a queue in which the packet should be queued, a destination port and/or node to which to send the packet, a change to the packet header, and/or a next match-and-action table to use as part of the steering process. The steering action entry may indicate which header data should be used and how the header data should be processed for lookup in the next match-and-action table. In this manner processing may pass from one match-and-action table to another. A hash used for lookup in a previous table may be accumulated with one or more future computed hash values so that lookup in one or more tables may be based on the accumulated hash value. The steering action entry may indicate whether the hash value should be accumulated. For example, lookup of one table may be based on a hash of the MAC header, lookup in another table may be based on the hash of the MAC header and a hash of the IP header combined using any suitable method (e.g., using concatenation and/or performing a hash on the combined MAC header hash and IP header hash), and lookup in another table may be based on the hash of the MAC header, the hash of the IP header, and a hash of a tunneling header.

The network device may be implemented as any suitable network device, for example, a NIC or a switch.

In some embodiments, the network device includes an interface which receives a data packet including a header section, and at least one parser which receives data of the header section of the packet, and parses the data of the header section yielding a first header portion, a second header portion, and optionally a third header portion, and so on. A memory of the network device stores match-and-action tables. Each match-and-action table includes respective indices and a respective steering action entry corresponding to each of the respective indices. A packet processing engine of the network device receives the first header portion, the second header portion, and so on, and fetches from the memory a first match-and-action table and matches a first index having a corresponding first steering action entry in the first match-and-action table responsively to the first header portion. In some embodiments, the packet processing engine computes a first hash value responsively to the first header portion and matches the first index in the first match-and-action table responsively to the first hash value yielding the first steering action entry.

The packet processing engine also computes a cumulative lookup value based on the first header portion and the second header portion responsively to the first steering action entry. In some embodiments, the first steering action entry indicates that the cumulative lookup value should be computed based on the second header portion, which is combined with the first header portion in a register.

In some embodiments, the packet processing engine computes a second hash value responsively to the second header portion. The first steering action entry indicates that the cumulative lookup value should be computed based on the second hash value (and the previously saved first hash value). Therefore, the packet processing engine computes the cumulative lookup value based on the first hash value and the second hash value responsively to the first steering action entry. In this way, the lookup in a second match-and-action table may be based on the combination of the first hash value and the second hash value, i.e., in a cumulative fashion.

In some embodiments, a steering action entry indicates to the packet processing engine to reset the cumulative lookup value. The packet processing engine then resets the cumulative lookup value. This may be performed prior to writing the current header portion or computed hash value to the register.

The packet processing engine fetches from the memory the second match-and-action table responsively to the first steering action entry (i.e., the first steering action entry indicates that the second match-and-action table should be retrieved next for lookup of the computed hash value or the second header portion).

In some embodiments, the first steering action entry indicates to the packet processing engine to use the cumulative lookup value when performing matching in the second match-and-action table. The packet processing engine is configured to match a second index having a corresponding second steering action entry in the second match-and-action table responsively to the cumulative lookup value.

In some embodiments, a steering action entry may indicate to the packet processing engine not to use the cumulative lookup value when performing matching in one of the match-and-action tables (even though the cumulative lookup value is still maintained for future use for matching in other match-and-action tables).

The packet processing engine steers the packet responsively to the one of the steering action entries of the tables traversed during the multi-stage steering process.

The cumulative lookup value may be comprised of two, three or more hash values of header portions depending on the configuration of the tables and the steering stage. For example, the packet processing engine fetches a third match-and-action table and matches a third index having a corresponding third steering action entry in the third match-and-action table responsively to the third header portion or the cumulative lookup value. In some embodiments, the packet processing engine computes the cumulative lookup value based on the first header portion, the second header portion, and the third header portion.

In some embodiments, the packet processing engine computes a third hash value responsively to the third header portion, and matches the third index in the third match-and-action table responsively to the third hash value or the cumulative lookup value. In some embodiments, the packet processing engine is configured to compute the cumulative lookup value based on the first hash value, the second hash value, and the third hash value.

A steering action entry may include any one or more of the following: forwarding the packet to be processed by at least one selected central processing unit; forwarding the packet to at least one selected destination; dropping the packet; forwarding the packet to an indicated destination; continuing processing with another one of the match-and-action tables; adding a current hash value to the cumulative lookup value; adding data of a header portion to the cumulative lookup value; using the cumulative lookup value when performing matching; not using the cumulative lookup value when performing matching; using a specific portion of the header section; or using a specific portion of the header section when computing a hash.

System Description

Reference is now made to FIG. 1, which is a block diagram view of a network device 10 constructed and operative in accordance with an embodiment of the present invention. The network device 10 may be any suitable device, for example, but not limited to, a router, a switch, or a network interface card (NIC). The network device 10 includes at least one network interface 12 configured to operate as at least one ingress port and at least one egress port for receiving packets from, and sending packets to, a packet data network 14.

The network device 10 also includes a buffer 16, hardware parsers 18, a packet processing engine 20, a controller 22, parser configuration registers 24, a cache memory 26, a memory 27 configured to store match-and-action tables 28, and optionally a communication bus interface 30.

Packets received by the network interface 12 are stored in the buffer 16. Header sections of the received packets are parsed by the hardware parsers 18 which are controlled by the controller 22, typically under instruction of the packet processing engine 20. At least some of the hardware parsers 18 parse the header sections according to data loaded into the parser configuration registers 24. The cache memory 26 caches a selection of parsing configuration data sets 32, which are selectively loaded into the parser configuration registers 24 from the cache memory 26 by the controller 22 under instruction from the packet processing engine 20. For example, one of the parsing configuration data sets 32 when loaded into one of the hardware parsers 18 may cause that hardware parser 18 to parse a header section as an MPLS header. Another one of the parsing configuration data sets 32 when loaded into one of the hardware parsers 18 may cause that hardware parser 18 to parse a header section as a VLAN header, and so on.

The hardware parsers 18 parse the various headers included in the header sections of packets and may optionally extract additional information from the header sections. The parsed information is stored in the buffer 16 for retrieval by the packet processing engine 20 and/or sent to the packet processing engine 20. In some embodiments, the header section is also sent by the hardware parsers 18 to the packet processing engine 20. The hardware parser 18 are described in more detail with reference to FIGS. 2-4.

The packet processing engine 20 uses the match and action tables 28 to determine how each packet should be processed according to the parsed information generated by the hardware parsers 18. The match and action tables 28 include indexes to match to the parsed information, and associated actions to be performed when a match is found. The indexes to be matched may be based on any field or sub-field from the packet, for example, MAC or IP addresses, security information, Transmission Control Protocol (TCP) data, User Datagram Protocol (UDP) data, Virtual Extensible Local Area Network (VXLAN) data, Generic Routing Encapsulation (GRE) data, and Generic Network Virtualization Encapsulation (GENEVE) data, by way of example only. The actions may include any suitable action or actions per match, for example, but not limited to, reparsing the header section using a different parsing configuration set, sending the packet to a given network node 36 via the packet data network 14, sending the packet to a given CPU 38 of a host 34 connected to the network device 10 via the communication bus interface 30, amending the header section, adding a new header, and/or removing a header, e.g., VLAN or Multi-Protocol Label Switching (MPLS). Additional actions are described with reference to FIG. 7. The communication bus interface 30 may operate in accordance with any suitable protocol, for example, but not limited to, PCIe (peripheral component interconnect express) interface standard.

For example, if a MAC address in the header section is matched to a given MAC address then the packet is to be reparsed by the hardware parsers 18 after the parser configuration registers 24 are loaded with parsing configuration data set A. In this example, the packet processing engine 20 instructs the controller 22 to load parsing configuration data set A from the cache memory 26 and send the header section, or a link to the header section in the buffer 16, to the hardware parsers 18 so that the header section can be reparsed according to parsing configuration data set A. By way of another example, if the parsed information includes data B, then the packet is forwarded to host C via the communication bus interface 30. By way of an additional example, if the parsed information includes data D, then the header section is amended. By way of yet another example, if the parsed information includes data E, then the packet is sent back to the packet data network 14 on port F. One or more actions may be associated with a single match.

The functionality of the packet processing engine 20 is also described with reference to FIGS. 5-9. In practice, some or all of the functions of the packet processing engine 20 may be combined in a single physical component or, alternatively, implemented using multiple physical components. These physical components may comprise hard-wired or programmable devices, or a combination of the two. In some embodiments, at least some of the functions of the packet processing engine 20 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

In practice, some or all of the functions of the controller 22 may be combined in a single physical component or, alternatively, implemented using multiple physical components. These physical components may comprise hard-wired or programmable devices, or a combination of the two. In some embodiments, at least some of the functions of the controller 22 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory. In some embodiments, the functionality of the controller 22 may be implemented in the packet processing engine 20.

In the example of FIG. 1, the network device 10 may be implemented as a network interface card for the host 34. The host 34 may include multiple CPUs 38 corresponding to different virtual network functions (VNFs). Each VNF may include one or more virtual machines (VMs). A hypervisor running on the host 34 may implement the VMs. In some examples, different VMs may be operated for different customers, each having their own parsing and packet processing requirements. Each customer may want to be able to configure the hardware parsers 18 of the network device 10 according to their own requirements. However, as the number of hardware parsers 18 is limited, the hardware parsers 18 cannot be programed with a single parsing configuration data set to parse the data of the different customers according to the customer needs. When a packet is received in the buffer 16, the hardware parsers 18 parse at least some of the header section according to a default parsing configuration data set. The packet processing engine 20 uses the match and action tables 28 to determine what action should be performed. One action may include reparsing the header section using the specific parsing configuration data set for the customer or VM associated with the header section. For example, a MAC address included in the header section may indicate the VM associated with this header section.

Figure 2:
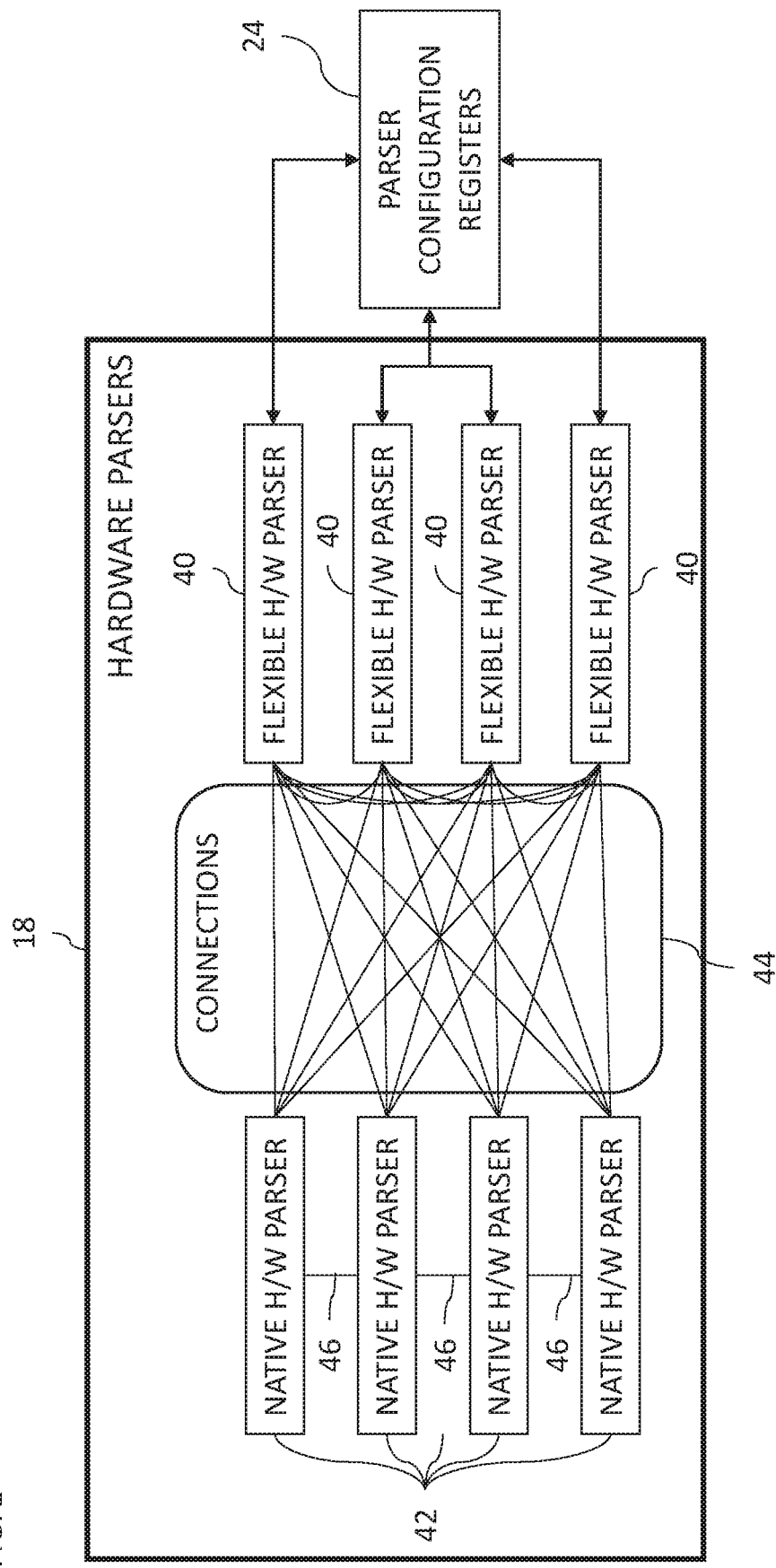
FIG. 2 is a block diagram view of hardware parsers in the device of FIG. 1 operative in accordance with an embodiment of the present invention.

Reference is now made to FIG. 2, which is a block diagram view of the hardware parsers 18 in the device 10 of FIG. 1 operative in accordance with an embodiment of the present invention. The hardware parsers 18 include flexible hardware parsers 40 and optionally one or more native hardware parsers 42 as shown in FIG. 2. The flexible hardware parsers 40 are configured to parse header section data according to the data in the parser configuration registers 24. The flexible hardware parsers 40 are therefore reconfigurable even after the network device 10 has been manufactured. The native hardware parsers 42 on the other hand are not generally reconfigurable after the network device 10 has been manufactured. For example, one of the native hardware parsers 42 may be configured to parse a MAC header, another one of the native hardware parsers 42 may be configured to parse a Multi-Protocol Label Switching (MPLS) header, while another one of the native hardware parsers 42 may be configured to parse a User Datagram Protocol (UDP) header. The native hardware parsers 42 may be connected together in a fixed order as shown in FIG. 2 so that when one of the native hardware parsers 42 finishes parsing part of a header section (e.g., one of the headers), the header section is passed to the next native hardware parser 42 in line via one of connections 46. Additionally, or alternatively, each of the native hardware parsers 42 may be connected via connections 44 to one or more (typically to each) of the flexible hardware parsers 40. For example, after one of the native hardware parsers 42 finishes parsing part of a header section (e.g., one of the headers), the header section is passed to one of the flexible hardware parsers 40 via one of the connections 44. The flexible hardware parsers 40 are also connected to each other via the connections 44 so that when one of the flexible hardware parsers 40 finishes parsing part of a header section (e.g., one of the headers), the header section is passed to another one of the flexible hardware parsers 40 via one of the connections 44. The connections 44 between the hardware parsers 40, 42 (i.e., which parser 40, 42 is to receive the header section for processing next) may be configured using the data in the parser configuration registers 24. For example, an identification of the connection 44 used to send the header section to the next parser 40, 42 may be included in the data stored in the parser configuration registers 24. For a given configuration of the hardware parsers 40, 42 some of the connections 44 may be enabled while others are disabled. The configuration of the connections 44 is described in more detail with reference to FIGS. 3-4.

In some embodiments, one of the flexible hardware parsers 40 may be configured as a zero-length parser, described in more detail below with reference to FIG. 4, whereby the flexible hardware parser 40 is used to pass the header section between two native hardware parsers 42 without actually parsing any of the header section.

The order of passing the header section between the hardware parsers 40, 42 is determined by the order of the headers in the header section. For example, if the header section includes, a MAC header, followed by an Internet Protocol (IP) header, following by a UDP header, followed by a Virtual Extensible Local Area Network (VXLAN) header, the hardware parsers 40, 42 and their connections 44 are configured to parse the MAC header, followed by the IP header, followed by the UDP header, followed by the VXLAN header. In some embodiments, the header section may include more than one of a particular header protocol. For example, when tunneling is employed, there may be two MAC headers. In such a case, both MAC headers may be parsed using the same flexible hardware parser 40 or native hardware parser 42 at different times in the parsing process. Alternatively, the MAC headers may each be parsed by different ones of the hardware parsers 40, 42. Tunneling is described in more detail with reference to FIG. 4 below.

Figure 3:
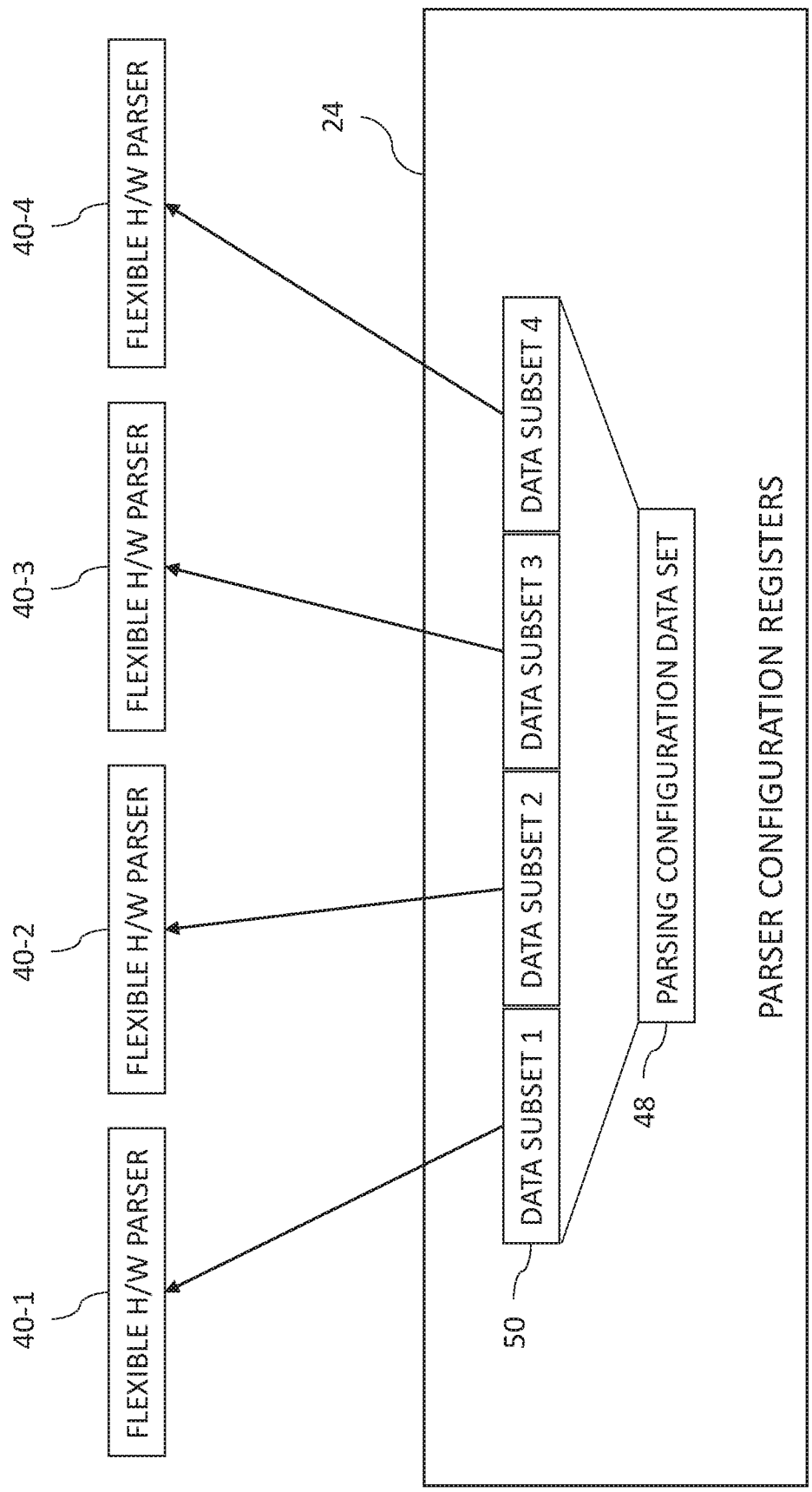
FIG. 3 is a block diagram view of hardware parsers accessing data from a parsing configuration data set in accordance with an embodiment of the present invention.

Reference is now made to FIG. 3, which is a block diagram view of flexible hardware parsers 40 accessing data from a parsing configuration data set 48 in accordance with an embodiment of the present invention. FIG. 3 shows that the parsing configuration data set 48 is currently loaded into the parser configuration registers 24. The parsing configuration data set 48 includes a plurality of data subsets 50. Respective ones of the data subsets 50 are used to configure respective ones of the flexible hardware parsers 40. For example, the flexible hardware parser 40-1 is configured according to the data in data subset 1, the flexible hardware parser 40-2 is configured according to the data in data subset 2, the flexible hardware parser 40-3 is configured according to the data in data subset 3, and the flexible hardware parser 40-4 is configured according to the data in data subset 4.

Figure 4:
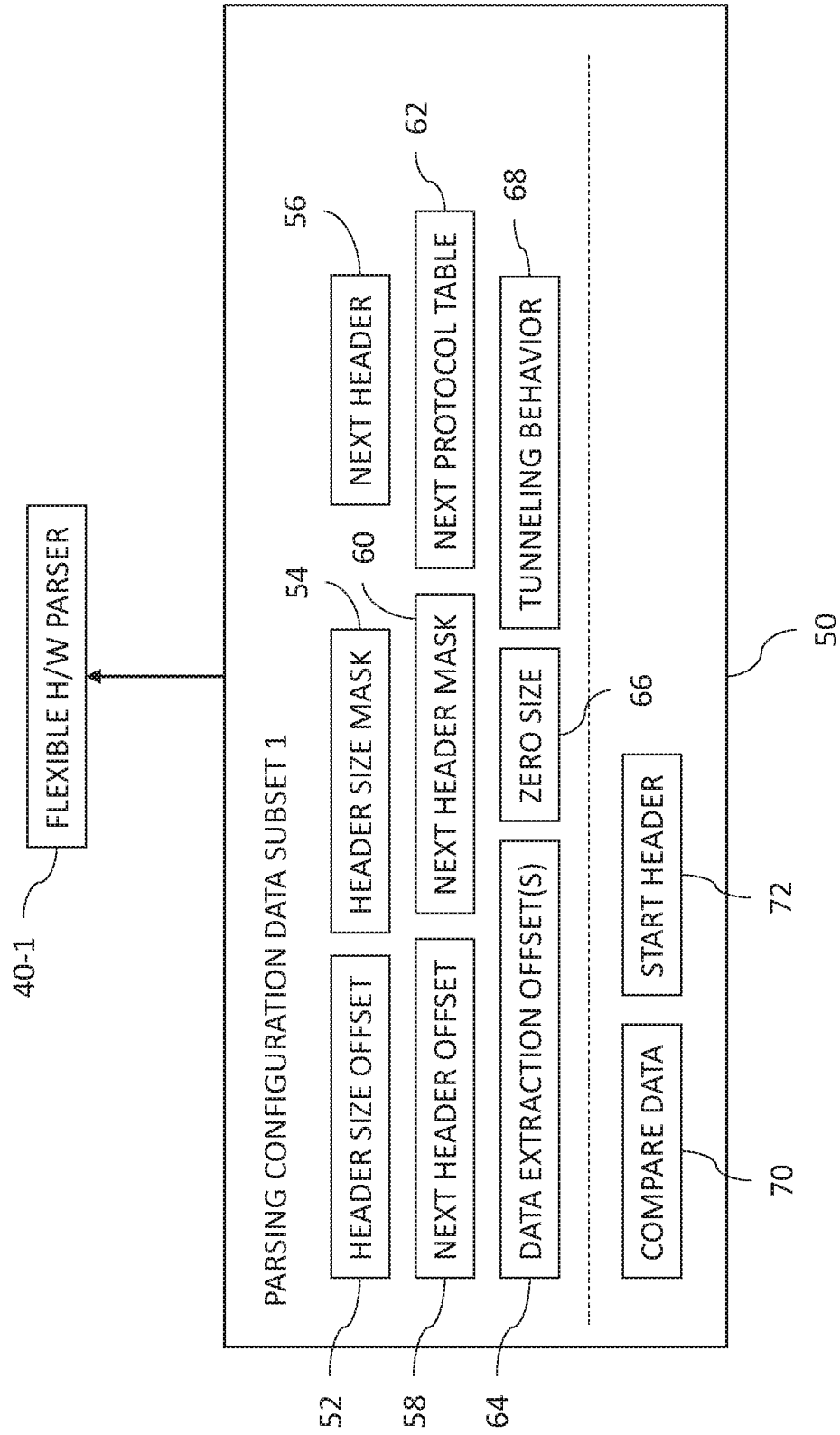
FIG. 4 is a block diagram view illustrating fields in the parsing configuration data set of FIG. 3 in accordance with an embodiment of the present invention.

Reference is now made to FIG. 4, which is a block diagram view illustrating fields in the parsing configuration data subset 1 (reference numeral 50) of FIG. 3 in accordance with an embodiment of the present invention.

The data subset 50 may include a header size field (not shown) which gives the size of the headers that the flexible hardware parser 40-1 is configured to parse. This field may be useful when the headers parsed by the flexible hardware parser 40-1 are all the same length. Alternatively, the data subset 50 may include a header size offset field 52, which provides the offset of a "header size field" in the header, which the flexible hardware parser 40 1 is configured to parse. The "header size field" in the header gives the size of the header. The header size offset is not the absolute offset with respect to the beginning of the header section, but the relative offset from the beginning of the current header being parsed. The data subset 50 may optionally include a header size mask field 54 giving the number of bits included in the header size field in the header.

The data subset 50 may include a next header field 56 which gives an identification of the next header to be parsed in the header section. This field may be useful when there is only one option for the next header from the current one. Alternatively, the data subset 50 may include a next header offset field 58 and a next header mask field 60. The next header offset field 58 provides the relative offset of a next header identification field in the header giving the identification of the next header to be parsed in the header section. The data subset 50 may also include a next protocol table 62, which maps next header identifications with protocols. The protocol value found in the next protocol table 62 may provide the identification of one of the connections 44 (FIG. 2) connecting the current flexible hardware parser with another hardware parser 40, 42. The next header mask field 60 provides the number of bits included in the next header identification field in the header.

The data subset 50 may include a data extraction offset field 64, which gives the offset(s) in the header of data to be extracted. The data subsets 50 may include a data extraction mask field which provides the number of bits to be extracted at the offset(s).

The data subset 50 may include a zero-size field 66, which indicates if the flexible hardware parser 40-1 is a zero-size parser. As mentioned above a zero-size parser may be used to pass the header section between two native hardware parsers 42 (or any two parsers) without proceeding any further into the packet.

The data subset 50 may include a tunneling behavior field 68. As mentioned above, the same parser 40, 42 may parse more than one header of the same type from a header section when tunneling is used. When a tunneled header (inner header) is to be processed a tunneling bit is sent with the header section to the next hardware parser 40, 42. When the next parser 40, 42 receives the header section with the tunneling bit, the parser 40, 42 processes the header according to tunneling which means that data produced from the parsing process (e.g., offset and extracted data) are saved to a location in the buffer 16 defined in the tunneling behavior field 68.

If the data subset 50 used by one of the flexible hardware parsers 40 does not include next header information or the header does not include next header information, parsing is stopped (and the header section is not passed to another hardware parser 40, 42) and further processing of the packet is passed to the packet processing engine 20 (FIG. 1).

As previously mentioned, parsing performed by native hardware parsers 42 is not configured by the parsing configuration data set stored in the parser configuration registers 24. However, in order to enable one of the native hardware parsers 42 to pass the header section to one of the flexible hardware parsers 40, the data subsets 50 include a compare data field 70 and a start header field 72. Each native hardware parser 42 includes a multiplexer (not shown) which receives the header section and the offset computed by that native hardware parser 42 from that native hardware parser 42 and routes the header section and the offset to the next flexible hardware parser 40 via one of the connections 44. The multiplexer selects the relevant connection 44 as follows. The multiplexer retrieves a next header identification from the header processed by that native hardware parser 42. The multiplexer searches the compare data field 70 of the data subsets 50 until a match is found. A match means that the multiplexer should send the header section and offset to the flexible hardware parser 40 associated with that data subset 50 in which the match was found. The multiplexer then retrieves the protocol value found in the start header field 72, of that data subset 50 in which the match was found, providing the identification of one of the connections 44 (FIG. 2) connecting to the flexible hardware parser 40 associated with that data subset 50. If the multiplexer cannot find a match to the next header identification in any of the data subsets 50 parsing is stopped and further processing of the packet is passed to the packet processing engine 20 (FIG. 1).

The parsing method is now described with reference to flexible hardware parser 40-1 for the sake of clarity. However, the method may be applied to any of the flexible hardware parsers 40.

The flexible hardware parser 40-1 is configured to receive the absolute offset (from the beginning of the header section) where the previous hardware parser 40, 42 completed parsing from the previous hardware parser 40, 42. If the flexible hardware parser 40-1 is the first parser to parse the header section, the flexible hardware parser 40-1 does not receive any offset and assumes that the offset is zero. The offset is used in the parsing process described below. Therefore, respective ones of the hardware parsers 40, 42 are configured to successively parse the header section according to respective offsets in the header section.

The flexible hardware parser 40-1 is configured to retrieve the header size offset from the header size offset field 52 (FIG. 4) and optionally the mask data from the header size mask field 54 (FIG. 4). The flexible hardware parser 40-1 is configured to retrieve the header size from the header size (relative) offset in the header. The flexible hardware parser 40-1 is configured to compute an offset for passing to the next hardware parser 40, 42 responsively to the retrieved header size and the received offset. The computed offset provides the offset of the last bit in this header. Therefore, the flexible hardware parser 40-1 is configured to compute the offset responsively to the header size offset field 52 (and optionally header size mask field 54) of the parsing configuration data and the header size from the header section, and the received offset. The computed offset may be saved in the buffer 16 and/or passed on to the packet processing engine 20 in addition to being passed on to the next hardware parser 40, 42.

As mentioned above, the data subset 50 of the parsing configuration data set 48 for the flexible hardware parser 40-1 includes data extraction offset field 64 identifying an offset(s) in the header section from which data is to be extracted. The flexible hardware parser 40-1 is configured to retrieve the offset(s) from the data extraction offset field 64, and extract data from the header of the header section responsively to the data extraction offset(s). The extracted data may be saved in the buffer 16 and/or passed on to the packet processing engine 20.

As mentioned above, the data subset 50 for the flexible hardware parser 40-1 includes: the next header offset field 58 providing the next header offset of the next header identification (ID) in the header of the header section; and the next protocol table 62 linking next header IDs with next protocols. The flexible hardware parser 40-1 is coupled to retrieve the next header offset from the data subset 50 for the flexible hardware parser 40-1 in the parser configuration registers 24 (FIG. 1). The flexible hardware parser 40-1 is coupled to retrieve the next header ID, which is located in the header of the header section at the next header offset, from the header section responsively to the retrieved next header offset. The flexible hardware parser 40-1 is coupled to retrieve an identification of a next protocol to be processed from the next protocol table 62 of the data subset 50 for the flexible hardware parser 40-1 in the parser configuration registers 24 (FIG. 1) responsively to the retrieved next header ID. The flexible hardware parser 40-1 is coupled to transfer the header section to one of the hardware parsers 40, 42, which is configured to parse the next header of the header section in accordance with the next protocol. The identification of the next protocol provides the identification of the connection 44 over which the flexible hardware parser 40-1 is connected to the next hardware parser 40, 42. The flexible hardware parser 40-1 is coupled to send the computed offset to the next hardware parser 40, 42. The above steps are repeated by the next hardware parser 40, and so on.

Reference is now made to FIGS. 5-9, which are block diagrams illustrating a multi-stage steering process on the network device 10 of FIG. 1. Reference is also made to FIG. 1. As previously mentioned, the network interface 12 and/or the communication bus interface 30 receive data packets, each data packet including a header section. The hardware parser(s) 18 are coupled to receive data of the header sections of the packets, and to parse the data of the header section of each packet yielding a plurality of header portions, for example, a first header portion, a second header portion, and optionally a third header portion, and so on. The hardware parser 18 may be configured to parse according to the method described above with reference to FIGS. 2-4 or any other suitable parsing method. The parsing may include flexible parsing and/or parsing based on hardwired and/or hardcoded parsers.

Figure 5:
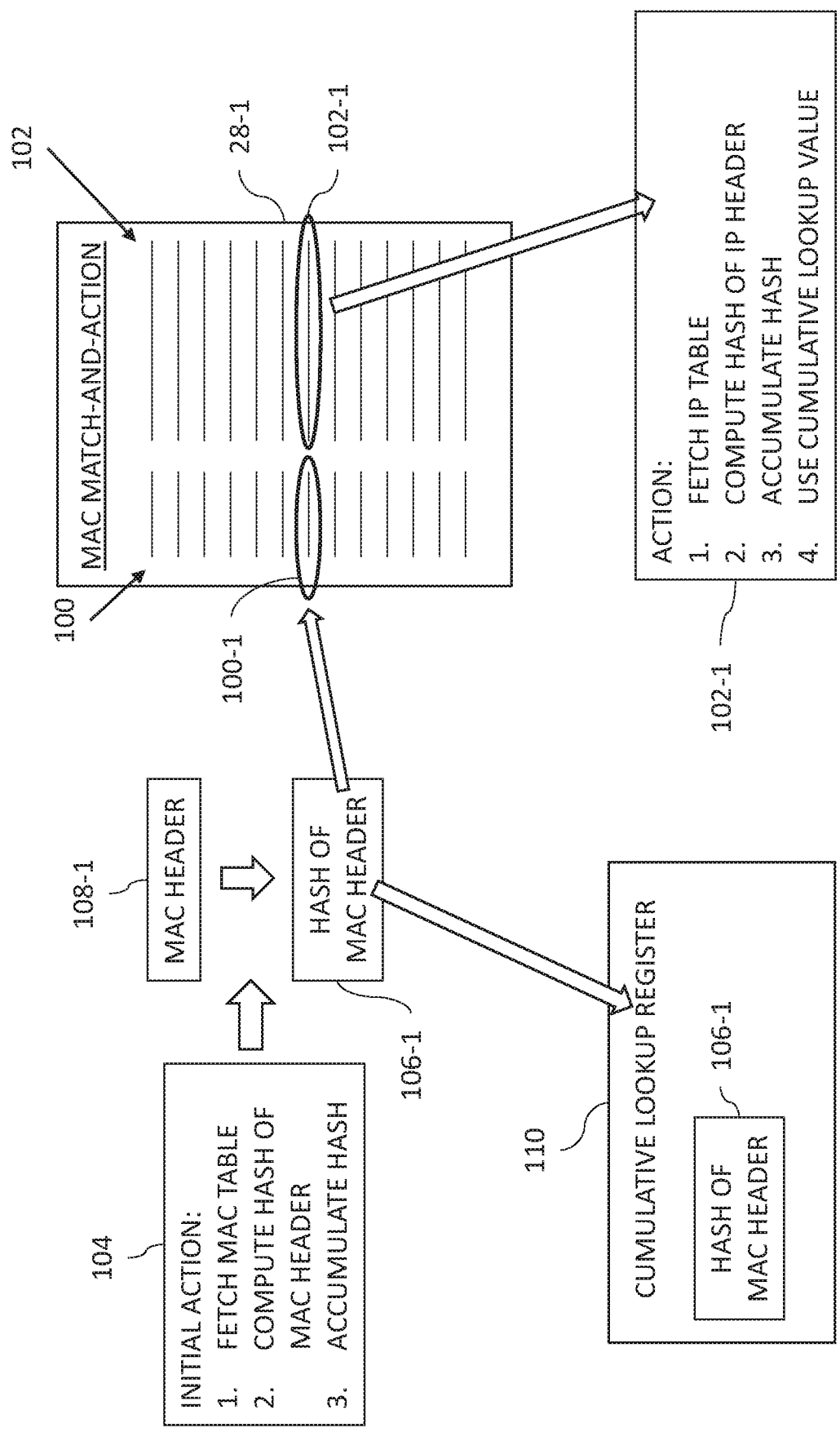
FIGS. 5-9 are block diagram views illustrating a multi-stage steering process on the network device of FIG. 1.

Each match-and-action table 28 includes respective indices and a respective steering action entry corresponding to each of the respective indices. FIG. 5 shows a MAC match-and-action table 28-1 which includes indices 100 and steering action entries 102, each index 100 and corresponding steering action entry forming a steering entry in the table 28-1.

Reference is now made to FIG. 5. The packet processing engine 20 (FIG. 1) is configured to fetch an initial action 104 from the memory 27. The initial action 104 may be in the form of a table or a string or any suitable data form. The initial action 104 may specify which table 28 should be fetched next from the memory 27, which hash should be computed, and if the computed hash should be accumulated. In the example of FIG. 5, the initial action 104 indicates that the MAC match-and-action table 28-1 should be fetched, a hash 106-1 of a MAC header 108-1 should be computed and the computed hash should be accumulated in a cumulative lookup register 110. FIG. 5 shows the hash 106-1 being added to the cumulative lookup register 110. FIG. 5 also shows the hash 106-1 being used for looking up the indices 100 in the match-and-action table 28-1 yielding a matching index 100-1 and a corresponding steering action entry 102-1, which indicates that a IP match-and-action table 28-2 (FIG. 6) should be fetched next, a hash of an IP header should be computed, the computed IP hash should be accumulated, and the cumulative lookup value should be used for lookup in the IP match-and-action table 28-2.

Therefore, the packet processing engine 20 is configured to receive a first header portion (e.g., the MAC header 108), and fetch from the memory 27 a first match-and-action table (e.g., the match-and-action table 28-1). The packet processing engine 20 is configured to match an index 100-1 having a corresponding steering action entry 102-1 in the match-and-action table 28-1 responsively to the first header portion (e.g., the MAC header 108-1). In some embodiments, the packet processing engine 20 is configured to compute the hash value 106-1 responsively to the first header portion (e.g., the MAC header 108-1) and match the index 100-1 in the match-and-action table 28-1 responsively to the hash value 106-1. The hash function used by the packet processing engine 20 to compute the hash of any of the header portions may include any suitable hash function, for example, but not limited to, CRC32, Toeplitz, Murmur, or Jenkins.

Figure 6:
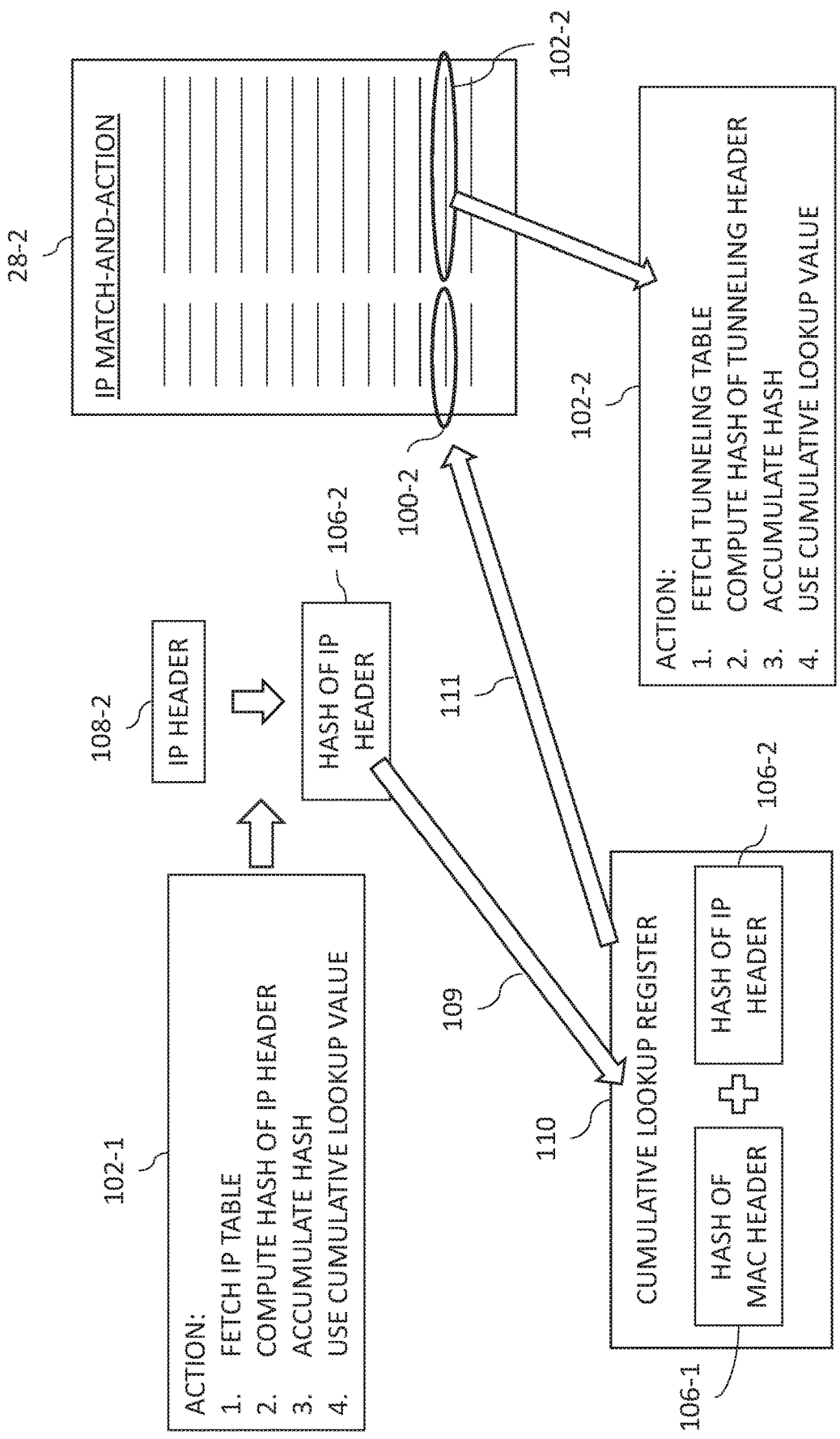

Reference is now made to FIG. 6. As mentioned with reference to FIG. 5, the steering action entry 102-1 indicates that the IP match-and-action table 28-2 should be fetched next, a hash 106-2 of an IP header 108-2 should be computed, the computed IP hash 106-2 should be accumulated, and the cumulative lookup value should be used for lookup in the IP match-and-action table 28-2.

FIG. 6 shows the hash 106-2 being added (arrow 109) to the cumulative lookup register 110. FIG. 6 also shows the cumulative lookup value (based on the hashes 106-1 and 106-2) being retrieved (arrow 111) from the cumulative lookup register 110 for looking up the indices 100 in the match-and-action table 28-2 yielding a matching index 100-2 and a corresponding steering action entry 102-2, which indicates that a tunneling match-and-action table 28-3 (FIG. 7) should be fetched next, a hash of a tunneling header should be computed, the computed tunneling hash should be accumulated, and the cumulative lookup value should be used for lookup in the tunneling match-and-action table 28-3.

Therefore, the packet processing engine 20 is configured to receive the IP header 108-2. The packet processing engine 20 is configured to compute a cumulative lookup value based on the first header portion (e.g., the MAC header 108-1) and a second header portion (e.g., the IP header 108-2) responsively to the steering action entry 102-1. In some embodiments, the steering action entry 102-1 indicates that the cumulative lookup value should be computed based on the second header portion.

In some embodiments, the packet processing engine 20 is configured to compute a hash value (e.g., the hash 106-2 of the IP header) responsively to the second header portion (e.g., the IP header 108-2). The steering action entry 102-1 indicates that the cumulative lookup value should be computed based on the hash value 106-2. The packet processing engine 20 is configured to compute the cumulative lookup value based on the hash value 106-1 and the hash value 106-2 responsively to the steering action entry 102-1. In some embodiments, the hash values 106-1, 106-2 are concatenated and then the result of the concatenation is optionally hashed or processed by another function.

The packet processing engine 20 is configured to fetch from the memory 27, the match-and-action table 28-2 responsively to the steering action entry 102-1. As shown in FIG. 6, the steering action entry 102-1 indicates to the packet processing engine 20 to use the cumulative lookup value when performing matching in the match-and-action table 28-2. The packet processing engine 20 is configured to match the index 100-2 having the corresponding steering action entry 102-2 in the match-and-action table 28-2 responsively to the cumulative lookup value.

Figure 7:
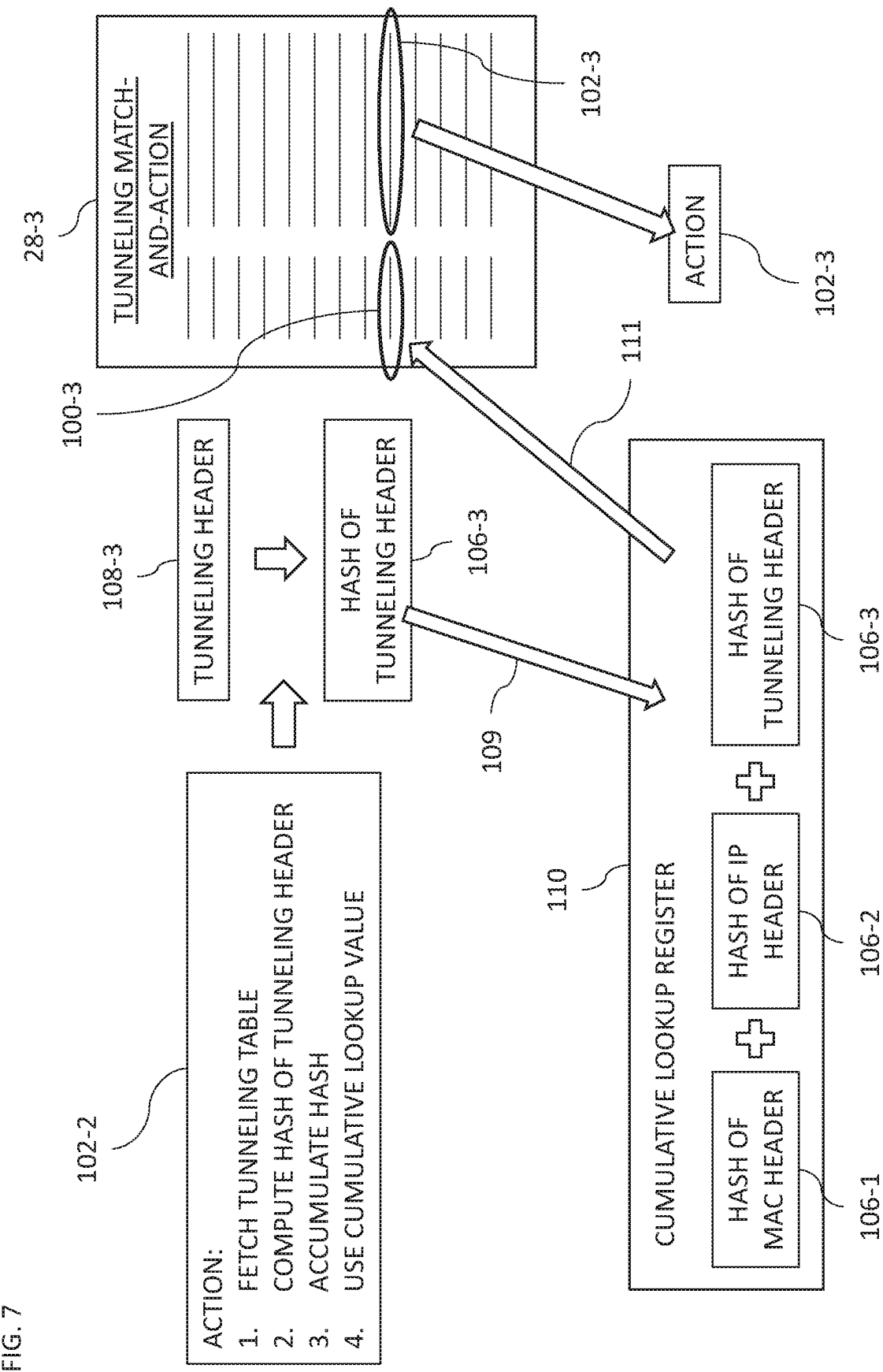

Reference is now made to FIG. 7. As mentioned with reference to FIG. 6, the steering action entry 102-2 indicates that the tunneling match-and-action table 28-3 should be fetched next, a hash of a tunneling header 108-3 should be computed, the computed tunneling header hash 106-3 should be accumulated, and the cumulative lookup value should be used for lookup in the tunneling match-and-action table 28-3.

FIG. 7 shows the hash 106-3 being added (arrow 109) to the cumulative lookup register 110. FIG. 7 also shows the cumulative lookup value (based on the hashes 106-1, 106-2, 106-3) being retrieved (arrow 111) from the cumulative lookup register 110 for looking up the indices 100 in the match-and-action table 28-3 yielding a matching index 100-3 and a corresponding steering action entry 102-3.

Therefore, in some embodiments, the packet processing engine 20 is configured to compute the hash value 106-3 responsively to the third header portion (e.g., the tunneling header 108-3). In some embodiments, the packet processing engine 20 is configured to compute the cumulative lookup value based on the first header portion (e.g., the MAC header 108-1 or the hash value 106-1), the second header portion (e.g., the IP header 108-2 or the hash value 106-2), and the third header portion (e.g. the tunneling header 108-3 or the hash value 106-3). In some embodiments, the hash values 106-1, 106-2, 106-3 are concatenated and then the result of the concatenation is optionally hashed or processed by another function. The packet processing engine 20 is configured to fetch the match-and-action table 28-3 and match the index 100-3 having the corresponding steering action entry 102-3 in the match-and-action table 28-3 responsively to the third header portion (e.g., the tunneling header 108-3 or the hash value 106-3 or the cumulative lookup value).

The packet processing engine 20 is configured to steer the packet responsively to one of the matching steering action entries 102. For example, the steering action entry 102-3 may indicate that the packet should be steered to CPU1 in the host 34 or to the network node 36. A steering action entry 102 may include any one or more of the following: forwarding the packet to be processed by at least one selected central processing unit; forwarding the packet to at least one selected destination; dropping the packet; forwarding the packet to an indicated destination; continuing processing with another one of the match-and-action tables 28; adding a current hash value to the cumulative lookup value; adding data of a header portion to the cumulative lookup value; using the cumulative lookup value when performing matching; not using the cumulative lookup value when performing matching; using a specific portion of the header section; or using a specific portion of the header section when computing a hash.

Figure 8:
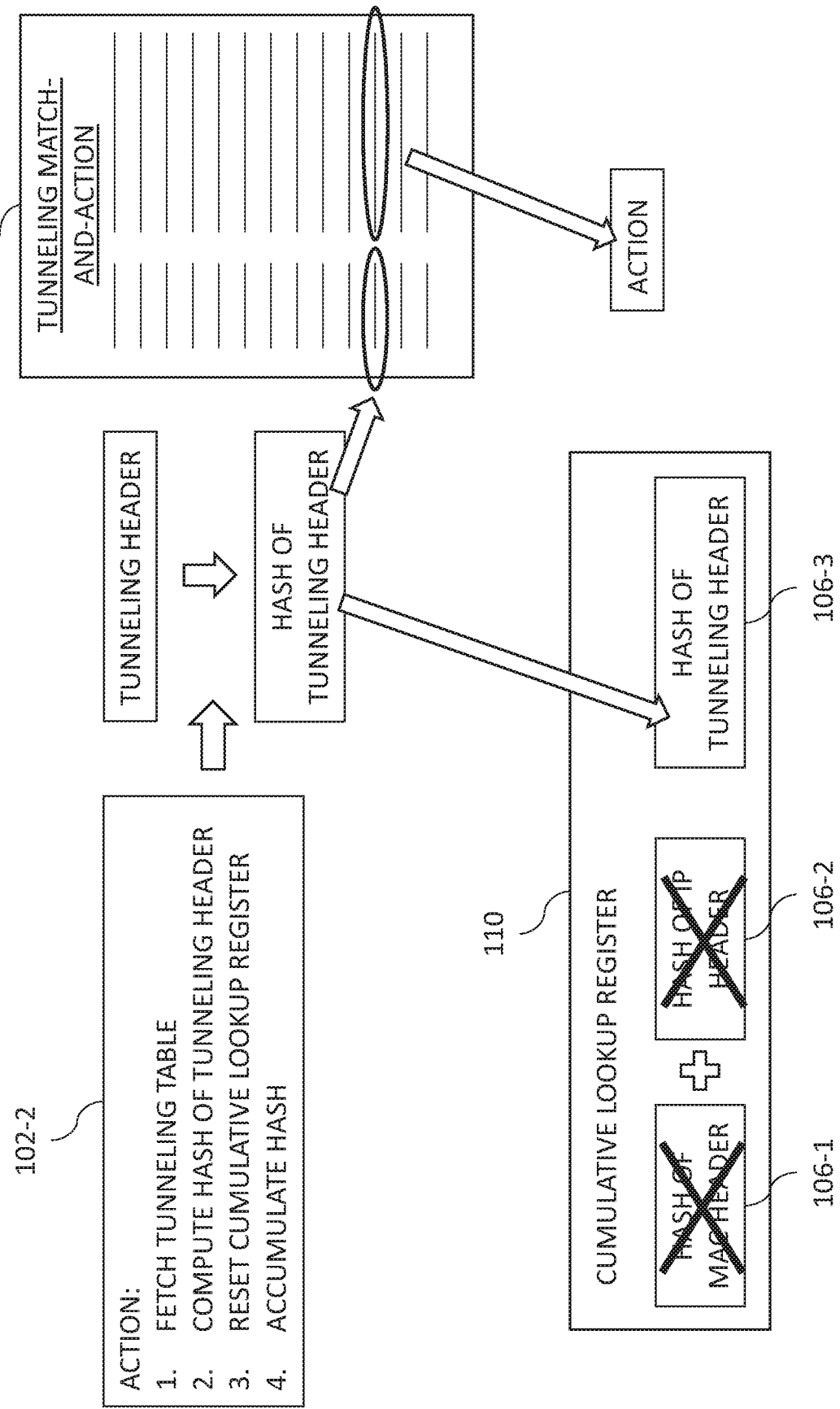

Reference is now made to FIG. 8. FIG. 8 illustrates when the steering action entry 102-2 indicates to the packet processing engine 20 to reset the cumulative lookup value (in the cumulative lookup register 110). FIG. 8 shows that the cumulative lookup register 110 is reset and the hash values 106-1 and 106-2 are removed from the cumulative lookup register 110. Therefore, the packet processing engine 20 is configured to reset the cumulative lookup value. The tunneling header hash 106-3 is then added to the cumulative lookup register 110. The match-and-action table 28-3 may be looked up based on the cumulative lookup value or the tunneling header 106-3, which may be the same value.

Figure 9:
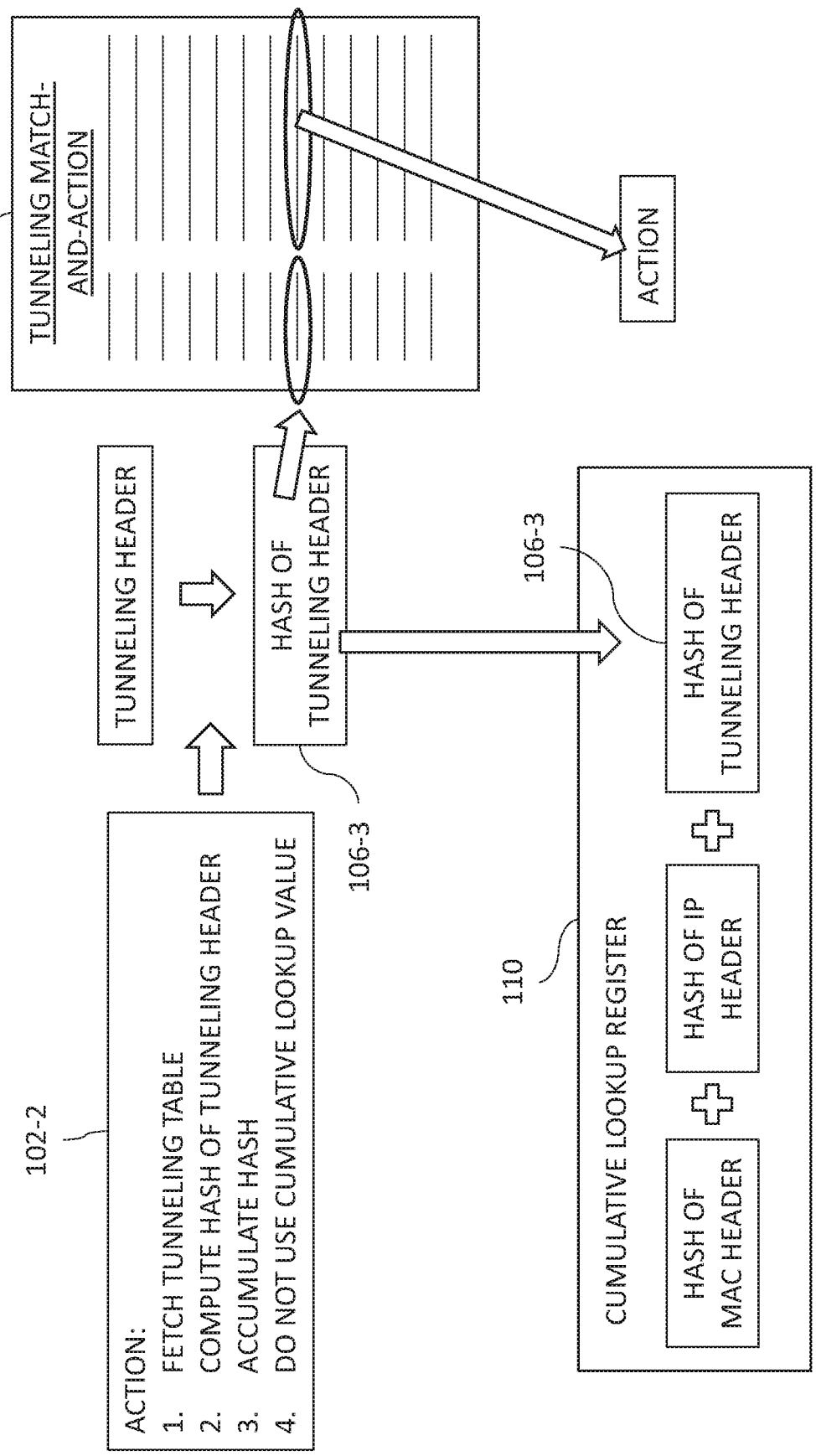

Reference is now made to FIG. 9. FIG. 9 illustrates when the steering action entry 102-2 indicates to the packet processing engine 20 not to use the cumulative lookup value when performing matching in the match-and-action table 28-3 even though (in this example) the cumulative lookup value is still maintained for future use in the cumulative lookup register 110. FIG. 9 shows that the hash value 106-3 is saved to the cumulative lookup register 110 and the hash value 106-3 is used for lookup in the match-and-action table 28-3 instead of using the cumulative lookup value.

FIGS. 5-9 illustrate the multi-stage steering process by way of three example match-and-action tables 28 using the MAC header, the IP header, and a tunneling header as input. The multi-stage steering process may use any suitable header information based on any of the header fields and/or sub-data of any of the header fields.

Figure 10A:
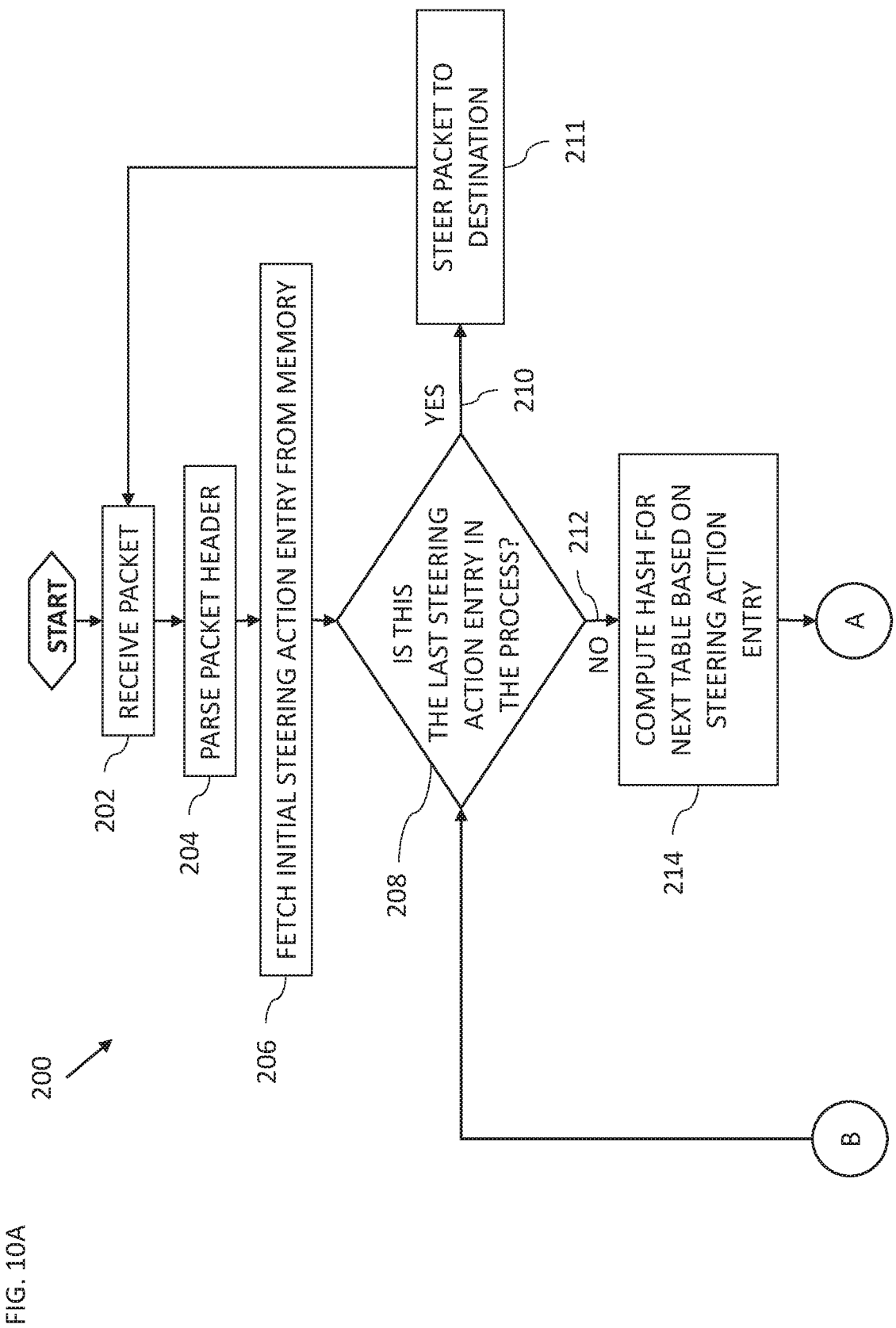
FIGS. 10A and 10B are two parts of a flowchart including steps in a method of operation of the network device of FIG. 1.
Figure 10B:
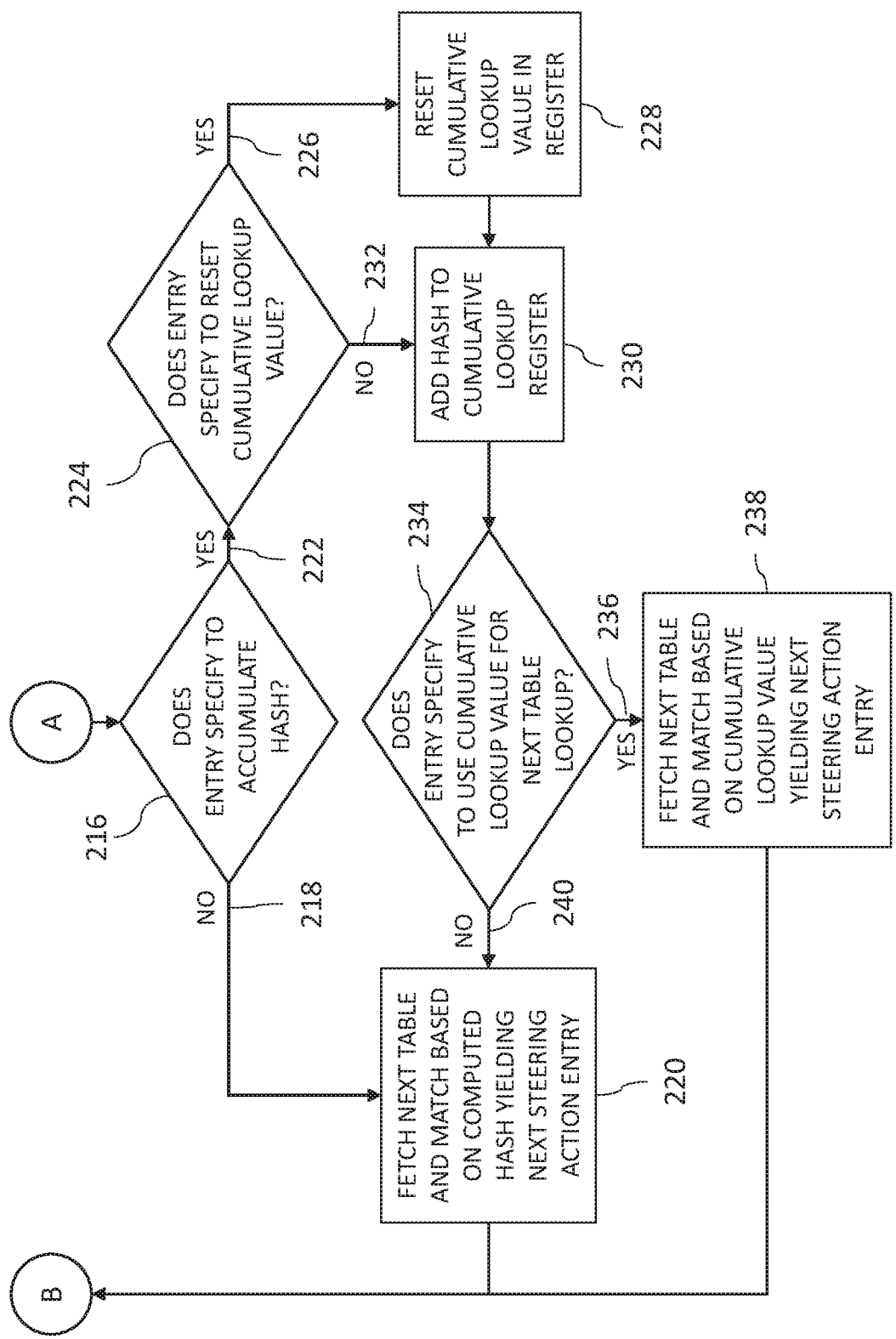

Reference is now made to FIGS. 10A and 10B, which are two parts of a flowchart 200 including steps in a method of operation of the network device 10 of FIG. 1. Reference is also made to FIG. 1. Starting with reference to FIG. 10A, the network device 10 is configured to receive (block 202) a packet. The hardware parser(s) 18 is configured to parse (block 204) the packet header. The packet processing engine 20 is configured to fetch (block 206) the initial steering action 104 (FIG. 5) from the memory 27. At a decision block 208, the packet processing engine 20 determines if this is the last steering action entry in the process or if one of the match-and-action tables 28 needs to be fetched and matched as part of the multi-stage steering process. If this is the last steering action entry (branch 210) the packet processing engine 20 is configured to steer (block 211) the packet to a destination queue (optionally based on a cumulative lookup value providing an index for the queue) or to an external destination when the steering is on the transmit side. If this is not the last steering action entry (branch 212), the packet processing engine 20 is configured to compute (block 214) a hash for lookup in the next table based on the indications in the steering action entry.

Continuing with reference to FIG. 10B, at a decision block 216, the packet processing engine 20 determines if the steering action entry specifies to accumulate the hash value 106 in the cumulative lookup register 110 (FIG. 5). If the steering action entry does not specify to accumulate the hash value 106 in the cumulative lookup register 110 (branch 218), the packet processing engine 20 is configured to fetch (block 220) the next match-and-action table 28 (as indicated in the steering action entry), and match the computed hash value 106 to the indices 100 in the fetched match-and-action table 28 yielding the next steering action entry 102. Processing then continues with the decision block 208 shown in FIG. 10A.

If the steering action entry does specify to accumulate the hash value 106 in the cumulative lookup register 110 (branch 222), the packet processing engine 20 is configured to determine at a decision block 224 if the steering action entry specifies to reset the cumulative lookup value. If the steering action entry specifies to reset the cumulative lookup value (branch 226), the packet processing engine 20 is configured to reset (block 228) the cumulative lookup value in the cumulative lookup register 110 and then add (block 230) the computed hash to the cumulative lookup register 110. If the steering action entry does not specify to reset the cumulative lookup value (branch 232), the packet processing engine 20 is configured to add (block 230) the computed hash to the cumulative lookup register 110.

At a decision block 234, the packet processing engine 20 is configured to determine if the steering action entry specifies to use the cumulative lookup value for the next table lookup. If the steering action entry specifies to use the cumulative lookup value for the next table lookup (branch 236), the packet processing engine 20 is configured to fetch (block 238) the next match-and-action table 28 (as indicated in the steering action entry), and match the cumulative lookup value to the indices 100 in the fetched match-and-action table 28 yielding the next steering action entry 102 and processing then continues with the decision block 208 shown in FIG. 10A. If the steering action entry does not specify to use the cumulative lookup value for the next table lookup (branch 240), the packet processing engine 20 is configured to fetch (block 220) the next match-and-action table 28 (as indicated in the steering action entry), and match the computed hash value 106 to the indices 100 in the fetched match-and-action table 28 yielding the next steering action entry 102 and processing then continues with the decision block 208 shown in FIG. 10A.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A network device, comprising:
an interface configured to receive a data packet including a header section;
at least one parser coupled to receive data of the header section of the packet, and configured to parse the data of the header section yielding a first header portion and a second header portion;
a memory configured to store a plurality of match-and-action tables, each match-and-action table including respective indices and a respective steering action entry corresponding to each of the respective indices; and
a packet processing engine coupled to receive the first header portion and the second header portion, and configured to:
fetch from the memory a first match-and-action table of the plurality of match-and-action tables;
match a first index having a corresponding first steering action entry in the first match-and-action table responsively to the first header portion;
compute a cumulative lookup value based on the first header portion and the second header portion responsively to the first steering action entry;
fetch from the memory a second match-and-action table of the plurality of match-and-action tables responsively to the first steering action entry;
match a second index having a corresponding second steering action entry in the second match-and-action table responsively to the cumulative lookup value; and
steer the packet responsively to the second steering action entry.

2. The device according to claim 1, wherein the first steering action entry indicates that the cumulative lookup value should be computed based on the second header portion.

3. The device according to claim 1, wherein the first steering action entry indicates to the packet processing engine to use the cumulative lookup value when performing matching in the second match-and-action table.

4. The device according to claim 1, wherein: a steering action entry indicates to the packet processing engine to reset the cumulative lookup value; and the packet processing engine is configured to reset the cumulative lookup value.

5. The device according to claim 1, wherein a steering action entry indicates to the packet processing engine not to use the cumulative lookup value when performing matching in one of the match-and-action tables.

6. The device according to claim 1, wherein:
the at least one parser is also configured to parse the data of the header section yielding a third header portion; and
the packet processing engine is configured to:
fetch a third match-and-action table of the plurality of match-and-action tables; and
match a third index having a corresponding third steering action entry in the third match-and-action table responsively to the third header portion.

7. The device according to claim 6, wherein the packet processing engine is configured to compute the cumulative lookup value based on the first header portion, the second header portion, and the third header portion.

8. The device according to claim 1, wherein the packet processing engine is configured to:
compute a first hash value responsively to the first header portion;
match the first index in the first match-and-action table responsively to the first hash value;
compute a second hash value responsively to the second header portion; and
compute the cumulative lookup value based on the first hash value and the second hash value responsively to the first steering action entry.

9. The device according to claim 8, wherein the first steering action entry indicates that the cumulative lookup value should be computed based on the second hash value.

10. The device according to claim 8, wherein the first steering action entry indicates to the packet processing engine to use the cumulative lookup value when performing matching in the second match-and-action table.

11. The device according to claim 8, wherein a steering action entry indicates to the packet processing engine to reset the cumulative lookup value; and the packet processing engine is configured to reset the cumulative lookup value.

12. The device according to claim 8, wherein a steering action entry indicates to the packet processing engine not to use the cumulative lookup value when performing matching in one of the match-and-action tables.

13. The device according to claim 8, wherein:
the at least one parser is also configured to parse the data of the header section yielding a third header portion; and
the packet processing engine is configured to:
compute a third hash value responsively to the third header portion;
fetch from the memory a third match-and-action table of the plurality of match-and-action tables; and
match a third index having a corresponding third steering action entry in the third match-and-action table responsively to the third hash value.

14. The device according to claim 13, wherein the packet processing engine is configured to compute the cumulative lookup value based on the first hash value, the second hash value, and the third hash value.

15. The device according to claim 1, wherein the first steering action entry includes any one or more of the following: forwarding the packet to be processed by at least one selected central processing unit; forwarding the packet to at least one selected destination; dropping the packet; forwarding the packet to an indicated destination; continuing processing with another one of the match-and-action tables; adding a current hash value to the cumulative lookup value; adding data of a header portion to the cumulative lookup value; using the cumulative lookup value when performing matching; not using the cumulative lookup value when performing matching; using a specific portion of the header section; or using a specific portion of the header section when computing a hash.

16. A networking method, comprising:
receiving a data packet including a header section;
parsing data of the header section yielding a first header portion and a second header portion;
storing a plurality of match-and-action tables, each match-and-action table including respective indices and a respective steering action entry corresponding to each of the respective indices;
fetching a first match-and-action table of the plurality of match-and-action tables;
matching a first index having a corresponding first steering action entry in the first match-and-action table responsively to the first header portion;
computing a cumulative lookup value based on the first header portion and the second header portion responsively to the first steering action entry;
fetching a second match-and-action table of the plurality of match-and-action tables responsively to the first steering action entry;
matching a second index having a corresponding second steering action entry in the second match-and-action table responsively to the cumulative lookup value; and
steering the packet responsively to the second steering action entry.

17. The method according to claim 16, further comprising:
parsing the data of the header section yielding a third header portion;
fetching a third match-and-action table of the plurality of match-and-action tables; and
matching a third index having a corresponding third steering action entry in the third match-and-action table responsively to the third header portion.

18. The method according to claim 16, further comprising:
computing a first hash value responsively to the first header portion;
matching the first index in the first match-and-action table responsively to the first hash value;
computing a second hash value responsively to the second header portion; and
computing the cumulative lookup value based on the first hash value and the second hash value responsively to the first steering action entry.

19. The method according to claim 16, further comprising:
parsing the data of the header section yielding a third header portion;
computing a third hash value responsively to the third header portion;
fetching a third match-and-action table of the plurality of match-and-action tables; and
matching a third index having a corresponding third steering action entry in the third match-and-action table responsively to the third hash value.

20. The method according to claim 16, wherein the first steering action entry includes any one or more of the following: forwarding the packet to be processed by at least one selected central processing unit; forwarding the packet to at least one selected destination; dropping the packet; forwarding the packet to an indicated destination; continuing processing with another one of the match-and-action tables; adding a current hash value to the cumulative lookup value; adding data of a header portion to the cumulative lookup value; using the cumulative lookup value when performing matching; not using the cumulative lookup value when performing matching; using a specific portion of the header section; or using a specific portion of the header section when computing a hash.

* * * * *